Sept. 7, 1937. T. G. McDOUGAL 2,092,001
METHOD OF MAKING CERAMIC PRODUCTS
Filed June 27, 1935 2 Sheets-Sheet 1

Inventor
Taine G. McDougal
By Blackmore, Spencer & Flint
Attorneys

Sept. 7, 1937.  T. G. McDOUGAL  2,092,001
METHOD OF MAKING CERAMIC PRODUCTS
Filed June 27, 1935  2 Sheets-Sheet 2

Inventor
Taine G. McDougal
By Blackmore, Spencer & Flint
Attorneys

Patented Sept. 7, 1937

2,092,001

UNITED STATES PATENT OFFICE 2,092,001

METHOD OF MAKING CERAMIC PRODUCTS

Taine G. McDougal, Flint, Mich., assignor to General Motors Corporation, Detroit, Mich., a corporation of Delaware Application June 27, 1935, Serial No. 28,661

6 Claims. (Cl. 25—156)

This invention has to do with a method of making ceramic wares out of non-plastic compositions. The invention is particularly directed to the manufacture of insulators for spark plugs.

It has heretofore been common practice to employ a considerable proportion of clay in the mix, the clay serving as a plasticizer making the batch workable for forming to shape. The addition of clay in conventional spark plug insulators has been in the neighborhood of 30 to 50%, and the presence of clay and particularly its silica and alkali content has had a detrimental effect on the fired body. It has also been the practice to employ flux along with the clay and non-plastic material to reduce the firing temperature to within the limits of the kilns ordinarily available. These fluxes have likewise had a detrimental effect on the bodies, particularly on the electrical resistance at high temperature, this property being known as the Te value.

While it has been known that various non-plastic materials possess properties which should make them desirable for use in spark plug insulators, the difficulty has been to find a commercial method of manufacture in which little or no clay or flux would be employed. Among the methods previously used to form bodies out of non-plastics, perhaps the most successful has been by casting in porous molds a slip of finely ground non-plastic and water, with or without the addition of a small proportion of acid to increase moldability or castability and dry strength. In a modification of this process pressure is applied to the slip increasing the flow of water into the mold pores but the pressure is necessarily of low order inasmuch as it is dissipated through the pores of the mold. While satisfactory bodies can be produced by these methods, they are essentially cumbersome and costly, requiring a large number of molds which soon become worthless due to clogging and breakage, and furthermore the formed body is fragile resulting in considerable loss in handling.

Another method known as "dry pressing" consists in pressing the ground and moistened refractory in suitable molds, but with this method laminations frequently appear in the final body producing weakness which may destroy its usefulness. The pressures heretofore employed in using this method have been relatively low, on the order of a few hundred pounds per square inch.

According to the present invention, non-plastic materials are ground to a high degree of fineness and moistened or made in the form of a slip (according to the method used) and thereafter subjected to very high pressures in a substantially closed mold, in such manner as to produce uniform stress throughout thereby producing formed bodies of substantially uniform density and free of laminations, and in such condition as to be capable of being readily handled in subsequent steps in manufacture. By firing these bodies to a very high maturing temperature, it is possible to produce sintering, which results in the production of a dense body of high Te value and resistance to heat shock free of the disadvantages inherent in conventional bodies employing a large proportion of clay, together with flux.

The improved process is capable of application to large numbers of non-plastic materials and mixtures thereof which heretofore have not been available for commercial use owing to difficulties in manufacture.

According to one embodiment of the present invention non-plastic refractory material such as aluminum oxide is ground to a fineness on the order of 1 to 5 microns and is then mixed with acid and a small proportion of water and preferably rubbed through a screen or spray dried or otherwise treated to granulate it to produce easy pouring when filling the mold. It is then charged into a yieldable mold, preferably of rubber, in order to distribute the molding pressure evenly throughout the body, and subjected to a high pressure, on the order of from 2,000 to 20,000 or more pounds per square inch to produce a uniformly dense body capable of being handled. According to this method a very small proportion of moisture is all that is required, on the order of 5%.

Figure 1:
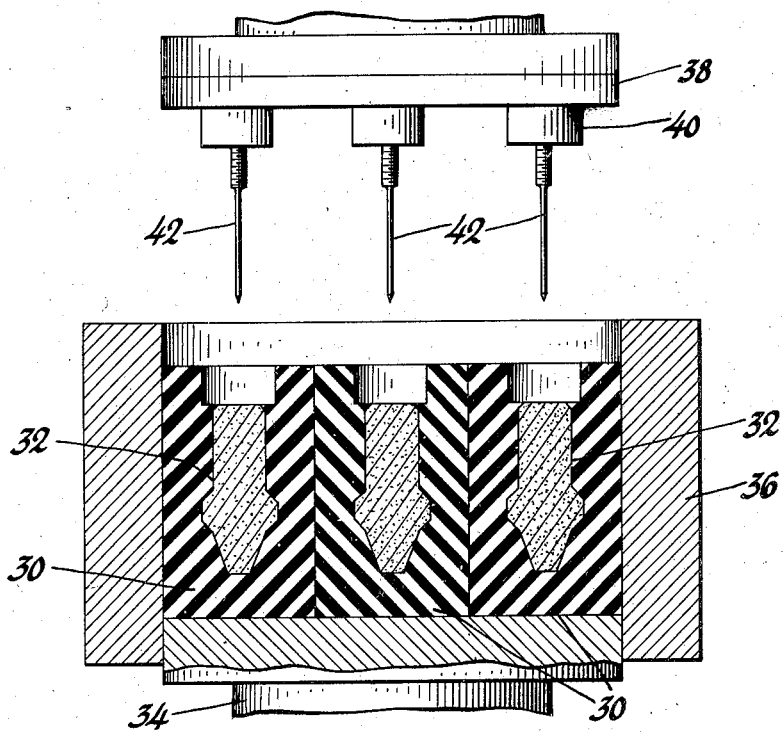
Figure 1 is a sectional view showing diagrammatically one form of die and rubber mold that may be used in carrying out the process, the parts being shown in withdrawn position.
Figure 2:
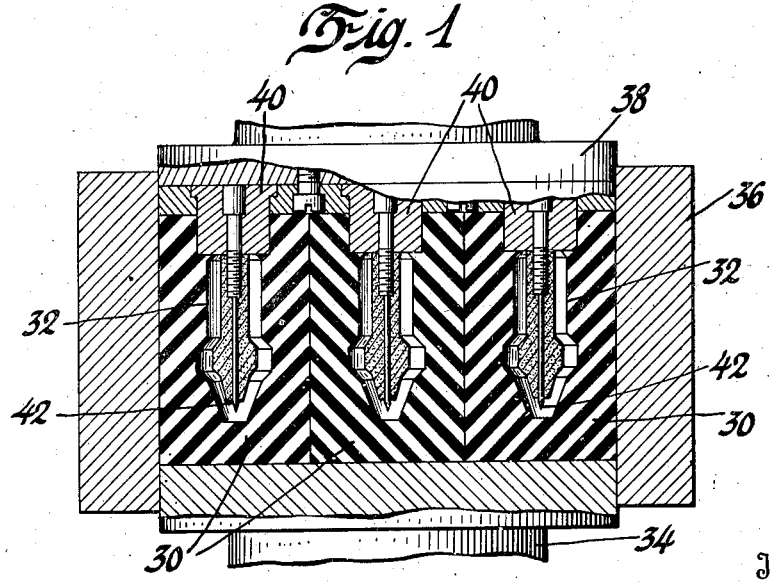
Figure 2 is a view of the parts shown in Figure 1 with the die partially withdrawn from the mold.

Figures 1 and 2 show one form of suitable rubber mold equipment. 30 indicates blocks of yieldable rubber having cavities 32 in them of the approximate shape desired in the final body. The rubber molds rest on a steel plunger 34 and are confined in a steel mold box 36. 38 indicates the cooperating plunger to which are secured mold inserts 40 closing the upper ends of the cavities in the rubber mold. From the inserts depend threaded pins 42 adapted to form the center-wire holes in the insulator.

In the use of the mold the cavities 32 are filled with the prepared material, the plungers are brought together, causing the rubber to exert a substantially uniform pressure on all portions of the material causing it to assume the shape shown in Figure 2. Figure 2 represents the position of the parts when the rubber has been relieved of pressure by partial withdrawal of the plungers. The next step consists in completing the separation of the upper plunger and mold whereupon the formed insulators may be unscrewed from the pins 42. In this as well as the form of apparatus next to be described the center pin aperture may be formed by a separate operation instead of in the molding process, if desired.

The body is subsequently fired to a very high temperature to produce sintering, this temperature in the case of aluminum oxide being in the neighborhood of 1,750° C. Should it be that the body as formed in molding is not shaped with sufficient accuracy it may be subsequently formed preliminary to sintering to the shape desired as by grinding or machining. It is possible by the described method to make bodies of a great variety of compositions but, in general, it will be found desirable to have the grain size of a major portion of the non-plastic not larger than on the order of 43 microns.

With many materials the acid has the effect of forming compounds with the non-plastic ingredients which when dried serve as a bond. Thus hydrochloric acid added to alumina produces aluminum chloride which serves as a bond. For many refractory materials additions of acid will not be necessary. Where it does not prove desirable to use acid to assist in holding the particles together, it will prove desirable to employ a suitable bond, preferably organic, the bond burning out during the final firing. Dextrin has proven to be a satisfactory bond in most cases. The dextrin is preferably added in the water which is added to the non-plastic.

The amount of pressure required may vary with the particular material handled, but in general will be within the range above indicated. The amount of water employed may be varied somewhat, although in general the amount should be kept to a minimum to reduce shrinkage on firing. To produce matured bodies in the case of the class of non-plastics to which this invention resides, temperatures in excess of cone 12 will be found necessary, the excess temperature depending upon the composition of the body. For the more severe uses, such as in spark plugs of internal combustion engines, I have had most success with the non-plastics requiring firing temperatures on the order of cone 30 or higher.

According to another embodiment of the invention it is possible to secure equalization of pressure throughout the body by pressing in nonyielding molds a ceramic mixture capable of flow under the conditions of temperature and pressure under which forming takes place.

Figure 3:
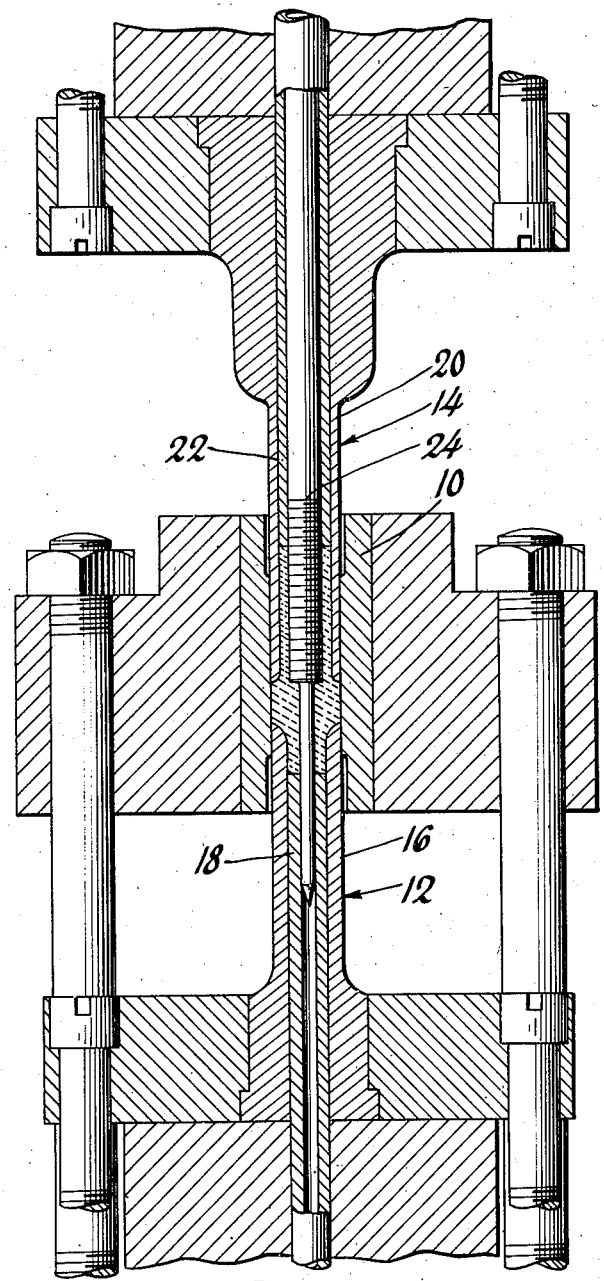
Figure 3 is a sectional view showing apparatus used in forming the articles when the non-plastic material is in the form of slip.

Thus the non-plastic material, preferably having a major proportion ground to the fineness above indicated, may be mixed with a larger proportion of water, for example, on the order of 14 to 20%. The resulting slip is charged into a suitably shaped multi-part mold which may be of the type shown in Figure 3 of the drawings consisting of a stationary central die member 10 and movable die members 12 and 14. The die member 12 preferably consists of an outer sleeve like portion 16 adapted to assist in the formation of the shoulder on the insulator and an inner cylindrical portion 18 adapted to form one end of the insulator. The die member 14 similarly consists of a cylindrical shoulder forming portion 20 and a cylindrical end forming portion 22. Within the portion 22 is preferably mounted the die member 24 which forms the threaded recess in the insulator. The figure illustrates the parts in their final forming position, it being obvious that the die members 12 and 14 must be retracted to permit removal of the body and refilling of the mold. The mold illustrated is closed except for the sliding fit between the parts. The fit between these parts is held to very close limits so that upon application of pressure substantially nothing but water is forced out between the parts.

With the described method of pressing, it has been found desirable to use pressures on the order of from 16,000 to 60,000 pounds per square inch. The resulting bodies have proven to be of substantially uniform density throughout owing to the fact that the water in the slip gives flow characteristics to the body while undergoing pressure resulting in an even distribution of stress and freedom from laminations and other undesirable structures. The strength of the body will vary somewhat with the amount and kind of bond used. Among the bonds used with this method are gum arabic, gum tragacanth, dextrin, flour paste, gelatin, and cold water paste, or by treating the non-plastic material with acid solution as above referred to.

In either method described I have found that increased pressure in forming the material or increased fineness of the refractory material employed results in a non-porous structure at a lower temperature than would otherwise be the case.

The method herein disclosed may be modified by making provision for elimination of gas from the material as by vacuum treatment before pressing or placing in the mold some material which will absorb the gas or by pressing under an atmosphere of gas which condenses at the higher pressures, but I have had success without making any special provision for this purpose.

The processes herein described are applicable in the manufacture of insulators and other articles out of a great variety of non-plastic materials, of which alumina and zircon are examples. Various combinations of non-plastics have also been successfully employed.

The invention is not limited to the manufacture of bodies made wholly of non-plastics but is equally desirable in the case of bodies containing too little clay to be sufficiently plastic to be handled by ordinary porcelain manufacturing methods.

The final firing of the bodies results in complete elimination of the binder and the subsequent sintering results in the production of a dense non-porous body well adapted for use as a spark plug insulator.

The apparatus disclosed in Figures 1 and 2 of this application is described and claimed in the copending application of Albra H. Fessler and Ralston Russell, Jr., filed June 27, 1935, under Serial No. 28,630. The apparatus disclosed in Figure 3 of this application is described and claimed in the copending application of Karl Schwartzwalder and Alex. S. Rulka, filed June 27, 1935, under Serial No. 28,631. The apparatus per se forms no part of the present invention except as it is illustrative of steps in the novel process herein described and claimed.

I claim:

1. The method of making ceramic articles which consists in pulverizing ceramic material, the major portion of which consists of non-plastics, to a grain size not larger than about 43 microns, subjecting the material to high pressure to cause the particles to form a coherent mass, and firing the mass at temperatures in excess of on the order of 1370° C. to form a dense, substantially impervious article.

2. The method of making ceramic articles which consists in pulverizing ceramic material, the major portion of which consists of non-plastics, subjecting the material to pressure not less than about 2,000 pounds per square inch to cause the particles to form a coherent mass, and firing the mass at temperatures sufficiently high to form a dense, substantially impervious article.

3. The method of making ceramic articles which consists in pulverizing ceramic material, the major portion of which consists of non-plastics, to a grain size not larger than about 43 microns, subjecting the material to pressure not less than about 2,000 pounds per square inch to cause the particles to form a coherent mass, and firing the mass at temperatures in excess of about 1370° C. to form a dense, substantially impervious article.

4. The method of making ceramic articles which consists in pulverizing non-plastic material to a grain size not larger than about 43 microns, adding to the pulverized material a proportion of material adapted to cause the particles to cohere but in insufficient amount to permit forming by plastic methods, subjecting the material to pressure of at least 2,000 pounds per square inch uniformly distributed throughout the mass causing the particles to form a coherent mass, and firing the mass at temperatures in excess of about 1370° C. to form a dense, substantially impervious article.

5. The method of making ceramic articles which consists in pulverizing non-plastic material to a grain size not larger than about forty-three microns, adding to the pulverized material a proportion of material adapted to cause the particles to cohere but in insufficient amount to permit forming by plastic methods, subjecting the material to pressure of at least 2,000 pounds per square inch uniformly distributed throughout the mass causing the particles to form a coherent mass, and firing the mass at temperatures in excess of about 1600° C. to form a dense, substantially impervious article.

6. The method of making ceramic articles which consists in pulverizing non-plastic ceramic material to a grain size not greater than about five microns, adding to the pulverized material a proportion of material adapted to cause the particles to cohere but in insufficient amount to permit forming by plastic methods, said material imparting flow characteristics to the batch at heavy pressure, subjecting the pulverized material to pressures not less than about 16,000 pounds per square inch in a closed mold to cause the particles to form a coherent mass and firing the mass at temperatures in excess of about Seger cone 30 to form a dense, substantially impervious article.

TAINE G. McDOUGAL.